(12) United States Patent
Berberig et al.

(10) Patent No.: US 12,339,149 B2
(45) Date of Patent: Jun. 24, 2025

(54) BERCLAMP-ON ULTRASONIC FLOWMETER

(71) Applicant: Endress+Hauser Flowtec AG, Reinach (CH)

(72) Inventors: Oliver Berberig, Grenzach-Wyhlen (DE); Thomas Fröhlich, Münchenstein (CH); Beat Kissling, Reinach (CH); Quirin Müller, Bättwil (CH); Klaus Bussinger, Aesch (CH)

(73) Assignee: Endress+Hauser Flowtec AG, Reinach (CH)

( * ) Notice: Subject to any disclaimer, the term of this patent is extended or adjusted under 35 U.S.C. 154(b) by 247 days.

(21) Appl. No.: 18/002,376

(22) PCT Filed: Jun. 16, 2021

(86) PCT No.: PCT/EP2021/066254
§ 371 (c)(1),
(2) Date: Dec. 19, 2022

(87) PCT Pub. No.: WO2021/255100
PCT Pub. Date: Dec. 23, 2021

(65) Prior Publication Data
US 2023/0228603 A1    Jul. 20, 2023

(30) Foreign Application Priority Data

Jun. 18, 2020   (DE) ..................... 10 2020 116 181.6

(51) Int. Cl.
*G01F 15/18*   (2006.01)
*G01F 1/66*    (2022.01)
(Continued)

(52) U.S. Cl.
CPC .............. *G01F 1/667* (2013.01); *G01F 1/662* (2013.01); *G01F 15/18* (2013.01); *G01P 5/241* (2013.01)

(58) Field of Classification Search
CPC . G01F 1/662; G01F 1/667; G01F 1/66; G01F 25/10; G01F 1/74; G01F 1/668;
(Continued)

(56) References Cited

U.S. PATENT DOCUMENTS

| | | | | |
|---|---|---|---|---|
| 4,397,194 A | * | 8/1983 | Soltz ......................... | G01F 1/66 73/861.28 |
| 5,440,937 A | * | 8/1995 | Lynnworth ............. | G01F 1/662 73/861.27 |

(Continued)

FOREIGN PATENT DOCUMENTS

| | | | | |
|---|---|---|---|---|
| DE | 102009059851 A1 | * | 7/2010 | ............. G01F 1/663 |
| FR | 2781047 A1 | | 1/2000 | |

(Continued)

*Primary Examiner* — Andre J Allen
(74) *Attorney, Agent, or Firm* — Kelly J. Smith; Endress+Hauser (USA) Holding, Inc.

(57) ABSTRACT

A clamp-on ultrasonic flowmeter includes pairs of ultrasonic transducers arranged on an exterior of a pipeline, and an electronic measuring/operating circuit for operating the transducers and for registering and evaluating measurement signals and for providing measured values of volume flow or flow velocity. The pairs are implemented as 1-traverse or 2-traverse pairs. One-traverse pairs are arranged on opposite sides of the pipeline, and 2-traverse pairs are arranged on a same side of the pipeline. At least three pairs are arranged on the pipeline and are distributed peripherally. Adjoining pairs of a number of pairs have an inner angle down to a minimum inner angle (MIA) between one another measured about a pipeline axis, which minimum inner angle obeys the following relationship:

$$MIA = 360°/(T*N*F(T,N))$$

(Continued)

with T as number of traverses and F(T,N)=0.38+0.62*T+ (0.048−0.01*T^2)*(N−2)^2.

9 Claims, 3 Drawing Sheets

(51) Int. Cl.
    *G01F 1/667*     (2022.01)
    *G01P 5/24*     (2006.01)

(58) Field of Classification Search
CPC .......... G01F 1/663; G01F 15/18; G01F 15/00; G01F 15/14; G01F 1/7082; G01F 15/185; G01F 1/712; G01F 15/08; G01F 1/666; G01F 15/006; G01F 1/002; G01F 1/665; G01F 15/024; G01F 1/36; G01F 1/42; G01F 23/296; G01F 7/00; G01F 1/58; G01F 25/15; G01F 1/849; G01F 15/02; G01F 15/005; G01F 15/12; G01F 23/2962; G01F 25/00; G01F 1/661; G01F 1/8422; G01F 23/26; G01F 1/44; G01F 1/8427; G01F 15/063; G01F 23/2968; G01F 1/00; G01F 23/284; G01F 3/22; G01F 15/066; G01F 1/3209; G01F 15/06; G01F 23/2966; G01F 5/00; G01F 1/692; G01F 1/708; G01F 1/80; G01F 1/8436; G01F 15/007; G01F 15/022; G01F 15/068; G01F 23/14; G01F 23/2965; G01F 23/2967; G01F 23/80; G01F 25/13; G01F 3/30; G01F 1/3282; G01F 1/584; G01F 1/588; G01F 1/60; G01F 1/84; G01F 1/8413; G01F 15/043; G01F 15/10; G01F 23/2961; G01F 1/05; G01F 1/22; G01F 1/24; G01F 1/32; G01F 1/3218; G01F 1/3266; G01F 1/68; G01F 1/704; G01F 1/72; G01F 1/8409; G01F 1/8418; G01F 1/8477; G01F 1/8495; G01F 1/86
See application file for complete search history.

(56) References Cited

U.S. PATENT DOCUMENTS

| | | | |
|---|---|---|---|
| 8,694,270 B2* | 4/2014 | Huang | G01F 1/667 |
| | | | 702/48 |
| 9,528,866 B2* | 12/2016 | Wiest | G01F 1/66 |
| 10,222,247 B2* | 3/2019 | Baumoel | G01F 1/74 |
| 10,627,273 B2 | 4/2020 | Deng et al. | |
| 10,641,641 B2* | 5/2020 | Ploss | G01F 1/665 |
| 2008/0141786 A1* | 6/2008 | von Klooster | G01F 1/662 |
| | | | 73/861.25 |
| 2015/0198470 A1* | 7/2015 | Brown | G01F 25/10 |
| | | | 73/861.27 |
| 2018/0328956 A1 | 11/2018 | Hies et al. | |
| 2020/0158693 A1 | 5/2020 | Bober et al. | |

FOREIGN PATENT DOCUMENTS

| | | | |
|---|---|---|---|
| KR | 100993617 B1 * | 11/2010 | |
| WO | 2011020143 A1 | 2/2011 | |
| WO | 2017125781 A1 | 7/2017 | |
| WO | 2019229409 A1 | 12/2019 | |

* cited by examiner

//BERCLAMP-ON ULTRASONIC FLOWMETER

CROSS-REFERENCE TO RELATED APPLICATIONS

The present application is related to and claims the priority benefit of DPMA Patent Application No. 10 2020 116 181.6, filed on Jun. 18, 2020 and International Patent Application No. PCT/EP2021/066254, filed on Jun. 16, 2021, the entire contents of which are incorporated herein by reference.

TECHNICAL FIELD

The invention relates to a clamp-on ultrasonic flowmeter working according to the travel time difference principle for measuring flow velocity, or volume flow, of a medium flowing through a pipeline. Pipelines, such as occur, for example, in industrial plants, usually have pipeline bends, branches, valves or the like, which influence, or disturb, flow of the medium through the pipeline. In the case of clamp-on flowmeters, it is important that a flow profile of the medium in the region of the flowmeter be fully developed, in order that flow can be determined within predetermined error limits based on signal travel time measurements of ultrasonic signals. Thus, disturbances of the flow, i.e., distortions of the flow profile, act disadvantageously on measurement performance of a clamp-on ultrasonic flowmeter. A deviation of a measured flow from an actual flow depends on an orientation of ultrasonic transducer pairs relative to a flow disturbance.

BACKGROUND

DE102013106108A1 provides, consequently, two pairs of ultrasonic transducers on the pipeline in a 180°-one traverse arrangement or in a 90°-two traverse arrangement. In this way, a fluctuation range of a measurement error due to a randomly selected orientation of the ultrasonic transducer arrangement relative to the flow disturbance can be limited to scarcely more than 2%. This is, however, not sufficient for many applications or customers.

SUMMARY

An object of the invention is, consequently, to provide a clamp-on ultrasonic flowmeter, in the case of which measurement performance is significantly improved.

The object is achieved by a clamp-on ultrasonic flowmeter as defined in the present disclosure.

A clamp-on ultrasonic flowmeter of the invention working according to the travel time difference principle for measuring flow velocity, or volume flow, of a medium flowing through a pipeline comprises:

A plurality of pairs of ultrasonic transducers, which are arranged on an exterior of a pipeline section, wherein each ultrasonic transducer of a pair is adapted to transmit ultrasonic signals into the pipeline section and to receive ultrasonic signals of the other ultrasonic transducer of the pair, wherein the ultrasonic transducers of each pair define a measurement path and are arranged especially in a longitudinal section plane of the pipeline section;

an electronic measuring/operating circuit for operating the ultrasonic transducers as well as for registering and evaluating measurement signals of the ultrasonic transducers as well as for providing measured values of volume flow or flow velocity, wherein the pairs are implemented as 1-traverse pairs or as 2-traverse pairs, wherein the ultrasonic transducers of a 1-traverse pair are arranged on opposite sides of the pipeline section, and wherein the ultrasonic transducers of a 2-traverse pair are arranged on a same side of the pipeline section, wherein at least three pairs are arranged on the pipeline section, wherein the pairs are distributed peripherally, wherein adjoining pairs of a number of pairs N have, in each case, an inner angle down to a minimum inner angle MIA between one another measured about a pipeline axis, which minimum inner angle obeys the following relationship:

$$MIA = 360°/(T*N*F(T,N))$$

with T as number of traverses and $F(T,N) = 0.38 + 0.62*T + (0.048 - 0.01*T^2)*(N-2)^2$.

This leads in the case of T=1 and N=3,4,5 to minimum angles of about 115°, 78° and 53°, as well as in the case of T=2 and A=3,4,5 to minimum angles of about 37°, 27° and 21°.

It has been found that, in this way, in a Reynolds number range from 12000 to 500000 a fluctuation range of a measurement error due to a randomly selected orientation of the ultrasonic transducer arrangement relative to the flow disturbance is significantly less than 2%, especially in the case of separations of the pairs from the flow disturbance of less than 5 inner diameters of the pipeline. Separations are measured, in such case, for example, from an outlet cross section of a flow disturbance to a measurement path midpoint.

Such a flow disturbance can be caused, for example, by one of the following objects or any sequence of such objects: pipeline bend, valve, pipeline narrowing, pipeline widening, pipeline branching. A clamp-on ultrasonic flowmeter of the invention is especially advantageous in the case of a sequence of a number of such objects, such as, for example, two pipeline bends following one after another and not lying in a plane.

In an embodiment, T=1, wherein angles between different neighboring pairs differ from one another by less than $6*(N-2)°$ and, especially, less than $6*(N-2)°-2°$ and preferably less than $6*(N-2)°-4°$.

In this way, a robust measuring performance results, which is little dependent on an orientation of the ultrasonic transducer relative to the flow disturbance. A remaining, approximately constant measurement error can then be easily compensated.

In an embodiment, T=2, wherein angles between different neighboring pairs differ from one another by less than $(60/N+8-N)°$ and, especially, less than $(60/N+6-N)°$ and preferably less than $(60/N+4-N)°$.

In this way, a robust measuring performance results, which is little dependent on an orientation of the ultrasonic transducer relative to the flow disturbance. A remaining, approximately constant measurement error can then be easily compensated.

In an embodiment, T=1, and a minimum total angle MTA is given by the following relationship: $MTA = (N-2)*(360°/N) + MIA$ and describes a minimum angle spanned by all pairs.

In an embodiment, the pairs are either 1-traverse pairs or 2-traverse pairs.

In an embodiment, the pairs have an equal separation from a flow disturbance relative to a midpoint of their measuring paths.

In this way, in an averaging of the contributions of the pairs to a flow measurement, an equal weighting can be used.

In an embodiment, the pairs have relative to a midpoint of their measuring paths a maximum separation of 40 ID, and, especially, 20 ID, and preferably 10 ID, wherein ID is the inner diameter of the pipeline.

Especially in the case of small separations, the flowmeter of the invention has significant advantages compared to the state of the art.

In an embodiment, T=2.

In this way, it is assured that the fluctuation range of the measurement error is less than 1% in a Reynolds number range from 12000 to 500000. Especially, in such case, the number of pairs is three or four. In this way, the fluctuation range less is than 0.6%.

In an embodiment, the pipeline section is a component of the clamp-on ultrasonic flowmeter and is integrated into the pipeline.

In an embodiment, the electronic measuring/operating circuit is adapted to calculate measured values of volume flow or flow velocity via an averaging of a measured variable of the ultrasonic signals.

For example, the operating circuit can cause the pairs to measure travel time difference sequentially, such that the pairs do not disturb one another. For creating flow measured values, for example, travel time differences of the pairs can be averaged and flow measured values created based thereon, or flows can be determined from individual travel time differences and then an averaging of flow measured values performed.

In an embodiment, N is less than 6.

In this way, problems in the arranging of the pairs can be prevented.

BRIEF DESCRIPTION OF THE DRAWINGS

The invention will now be described based on examples of embodiments presented in the appended drawing, the figures of which show as follows.

DETAILED DESCRIPTION

Figure 1A:
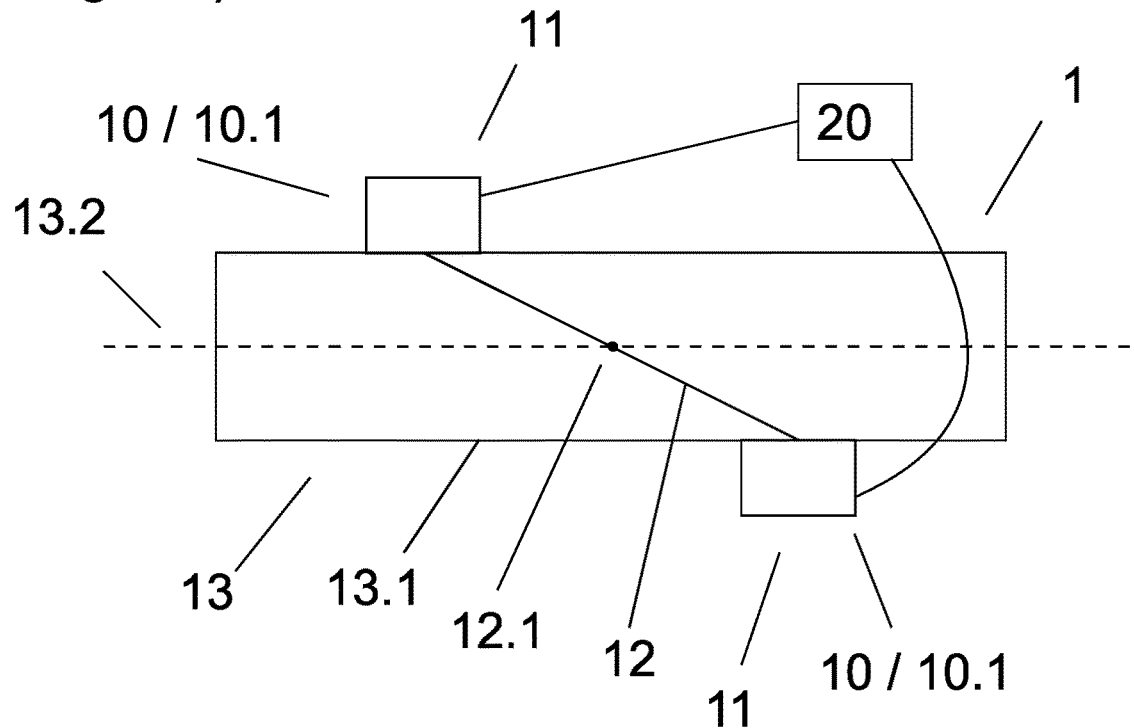
FIGS. 1a) and b) show clamp-on ultrasonic flowmeters.

FIG. 1a) shows a clamp-on ultrasonic flowmeter 1 having a pair 10 of ultrasonic transducers 11 arranged as a 1-traverse pair 10.1 on opposite sides of an exterior 13.1 of a pipeline section 13. The ultrasonic transducers are arranged offset in parallel with a pipeline axis 13.2, such that a measuring path 12 between the ultrasonic transducers extends inclined relative to a flow direction of the medium. In this way, ultrasonic signals experience a flow dependent lengthening or shortening of a signal travel time. A midpoint 12.1 of the measuring path 12 lies, in such case, on the pipeline axis.

Figure 1B:
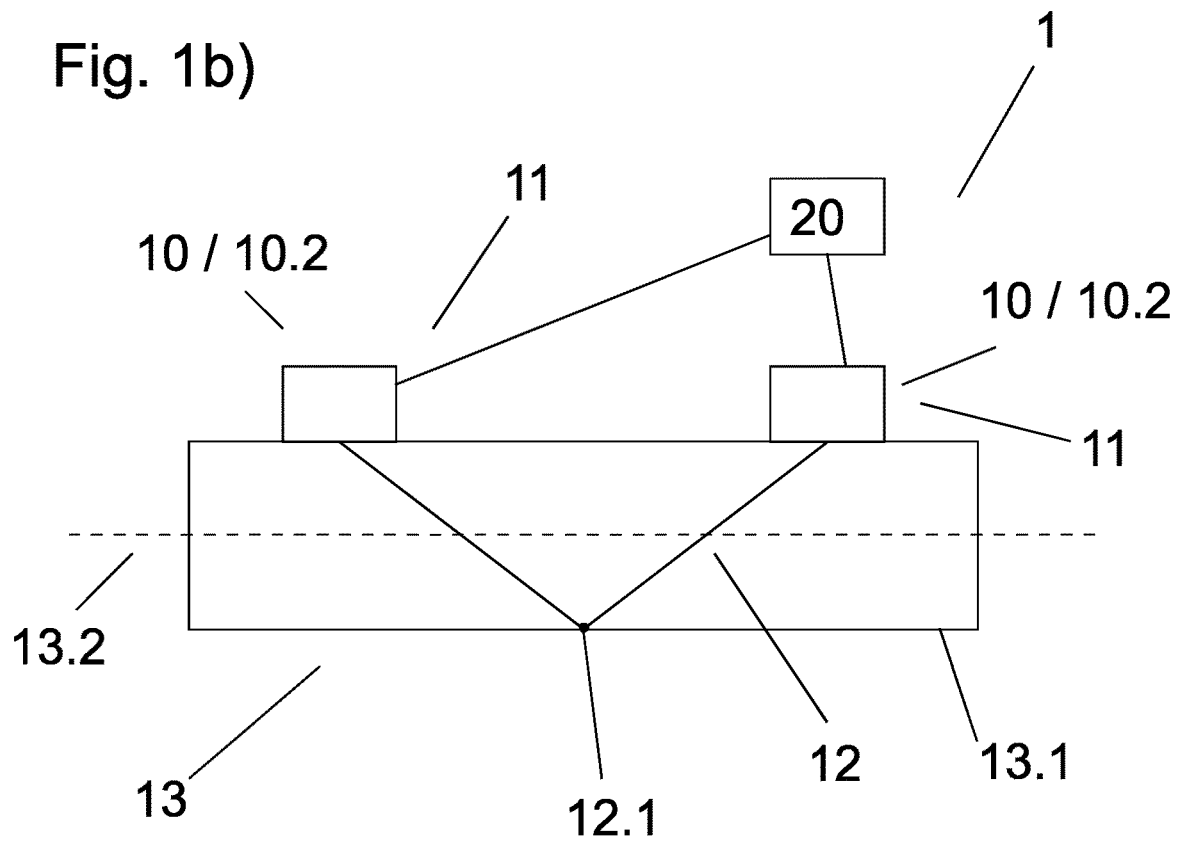

FIG. 1b) shows a clamp-on ultrasonic flowmeter 1 having a pair 10 of ultrasonic transducers 11, which are arranged as a 2-traverse pair 10.2 on a same side of an exterior 13.1 of a pipeline section 13. The ultrasonic transducers are arranged offset in parallel with a pipeline axis 13.2, such that a measuring path 12 between the ultrasonic transducers extends inclined to a flow direction of the medium. In this way, ultrasonic signals experience a flow dependent lengthening or shortening of a signal travel time. A midpoint of the measuring path 12 lies, in such case, on an inside of a pipeline wall.

In the case of a circularly shaped cross section of the pipeline, the ultrasonic transducers of a pair lie, in both cases, in a longitudinal section of the measuring tube extending along the measuring tube axis.

The pipeline section can, in such case, be part of the flowmeter, wherein in the case of construction of a measuring point the flowmeter is integrated via the pipeline section into a pipeline. The pipeline section corresponds then to a measuring tube of the clamp-on ultrasonic flowmeter. Alternatively, the clamp-on ultrasonic flowmeter has no measuring tube and the ultrasonic transducers are then placed on the outside of an existing pipeline or pipeline section.

Figure 2:
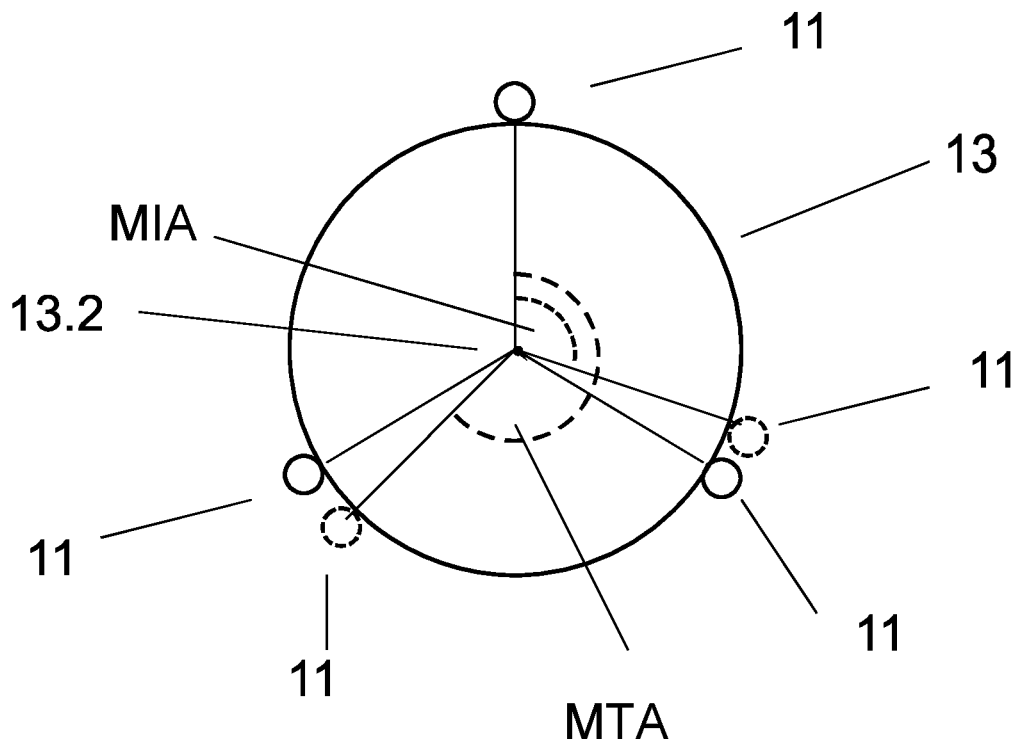
FIGS. 2a) and b) show by way of example, 1-traverse arrangements of the present disclosure.
Figure 2:
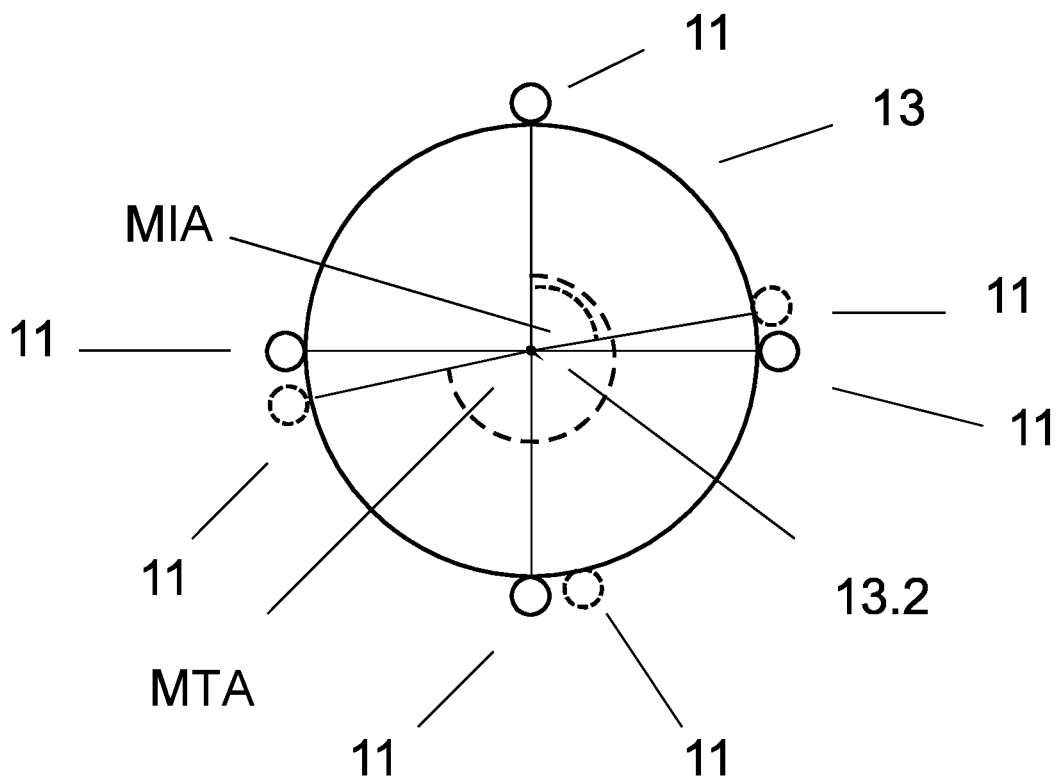

FIGS. 2a) and b) show, schematically, arrangements of the invention of the ultrasonic transducers of a 1-traverse clamp-on ultrasonic flowmeter having three, respectively four, ultrasonic transducer pairs in a front view, wherein, for purposes of illustration, for each pair, only the upstream, or only the downstream, lying pair is shown.

In the relationship MIA=360°/(T*N*F(T,N)) with T as number of traverses, N as number of ultrasonic transducer pairs, MIA as minimum angle between any neighboring pairs and F(T,N)=0.38+0.62*T+(0.048−0.01*T^2)*(N−2)^2, in the case of three pairs, the ultrasonic transducers (solid circles) can, for example, be spaced at an angle 120° from one another, however, the angle between two pairs can also be less, namely at least MIA, in such case, 115°, such as shown with the dashed circles. For purposes of perspicuity, the minimum angle is only shown between one pair of neighboring ultrasonic transducer pairs. The angles are measured about the pipeline axis 13.2. In the case of four pairs, the ultrasonic transducers can be spaced from one another by an angle of 90°, however, the angle can also be less, namely at least MIA, in such case, 78°. Similar considerations hold also for five or more pairs.

Especially, the number N of pairs covers a minimum total angle MTA, which is given by the following relationship: MTA=(N−2)*(360°/N)+MIA. In this way, the arrangement of the pairs is still robust and a fluctuation range of a measurement error due to a randomly selected orientation is yet smaller.

In an embodiment, when T=1, the angles between different neighboring pairs differ from one another by less than 6*(N−2)° and, especially, less than 6*(N−2)°−2° and preferably less than 6*(N−2)°−4°.

Figure 3:
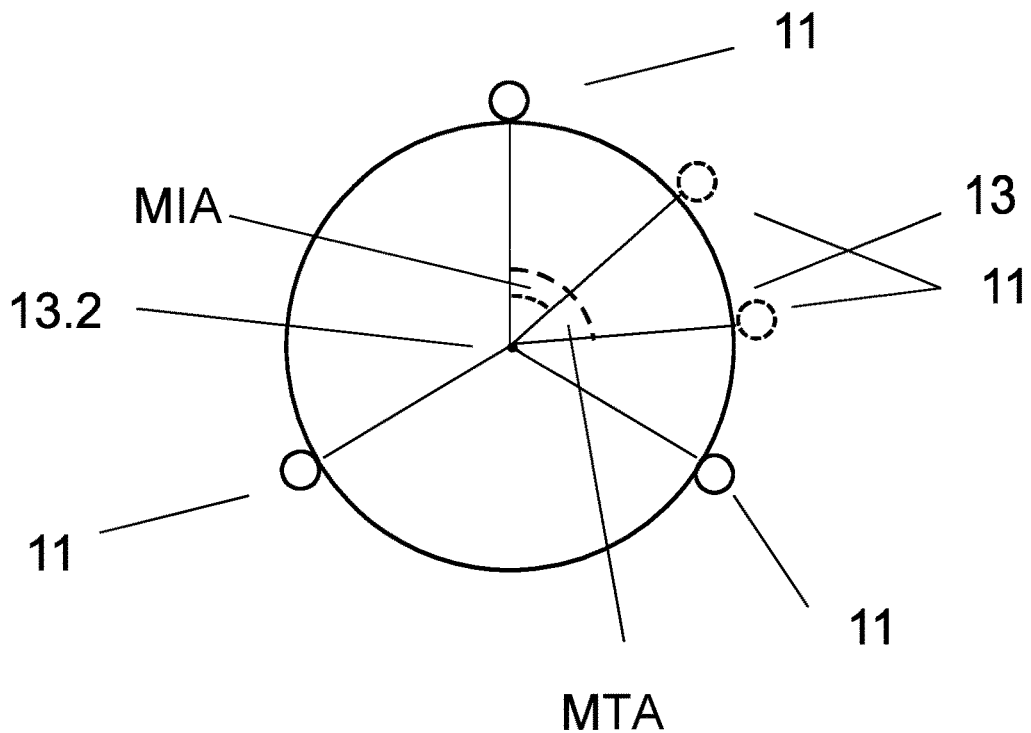
FIGS. 3a) and b) show by way of example, 2-traverse arrangements of the present disclosure.
Figure 3:
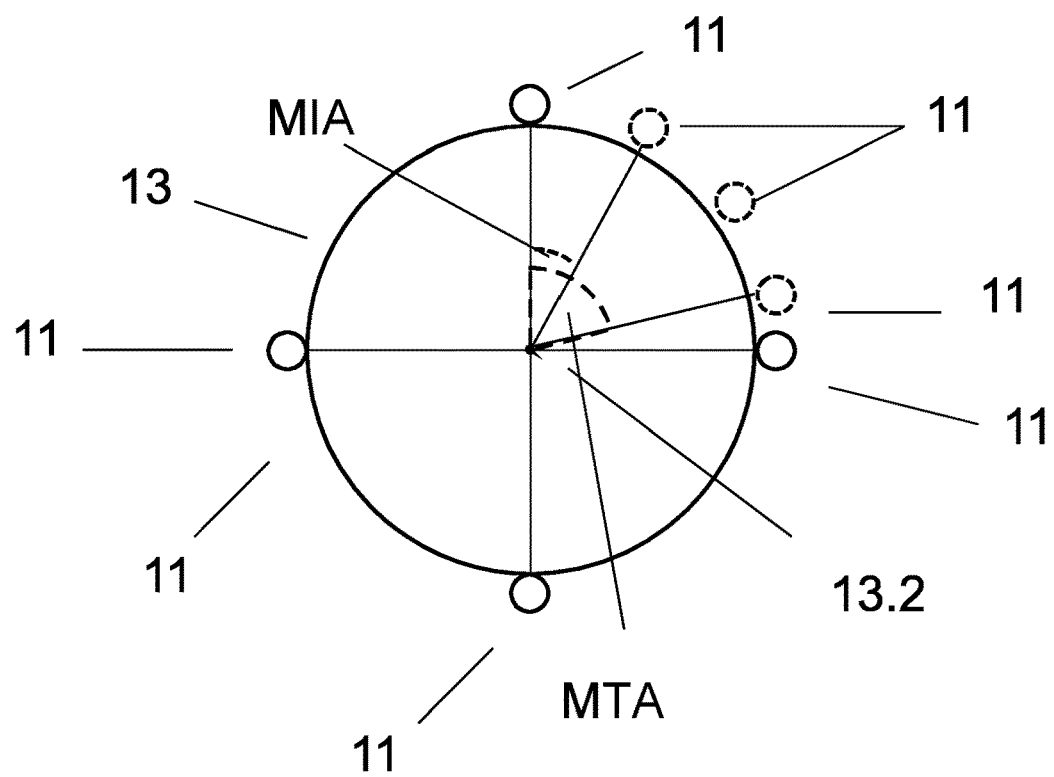

FIGS. 3a) and b) show, schematically, arrangements of the invention of the ultrasonic transducers of a 2-traverse clamp-on ultrasonic flowmeter having three, respectively four, ultrasonic transducer pairs in a front view, wherein, for purposes of illustration, for each pair, only the upstream, or only the downstream, lying pair is shown.

In the relationship MIA=360°/(T*N*F(T,N)) with T as number of traverses, N as number of ultrasonic transducer pairs, MIA as minimum inner angle between any neighboring pairs and F(T,N)=0.38+0.62*T+(0.048−0.01*T^2)*(N−2)^2, in the case of three pairs (solid circles), the ultrasonic transducers can, for example, be spaced from one another at an angle 120° (solid circles), however, the angle can also be less, namely at least MIA, in such case, 37°, such as shown with the dashed circles. The angles are measured about the pipeline axis 13.2. In the case of four pairs, the ultrasonic transducers can be spaced from one another by an angle of 90°, however, the angle can also be less, namely at least MIA, in such case, 27°. Similar considerations hold also for five or more pairs. For purposes of perspicuity, the minimum inner angle MIA is only indicated between one pair of neighboring ultrasonic transducer pairs In this way, a robust measuring performance is obtained, which is little dependent on an orientation of the ultrasonic transducers relative to the flow disturbance. A remaining, approximately constant measurement error can then be easily compensated.

In an embodiment, when T=2, the angles between different neighboring pairs differ from one another by less than $(60/N+8-N)°$ and, especially, less than $(60/N+6-N)°$ and preferably less than $(60/N+4-N)°$.

The pipeline has a circularly shaped cross section in the region of the ultrasonic transducer arrangement.

The minimum total angle MTA is, in such case, a smallest angle, which extends from a first pair of ultrasonic transducers to a last pair of ultrasonic transducers N−2.

The invention claimed is:

1. A clamp-on ultrasonic flowmeter working according to the travel time difference principle for measuring flow velocity, or volume flow, of a medium flowing through a pipeline of circularly shaped cross section, comprising:
    a plurality of pairs of ultrasonic transducers, which are arranged on an exterior of a pipeline section, wherein each ultrasonic transducer of a pair is adapted to transmit ultrasonic signals into the pipeline section and to receive ultrasonic signals of the other ultrasonic transducer of the pair, wherein the ultrasonic transducers of each pair define a measurement path and are arranged especially in a longitudinal section plane of the pipeline section;
    an electronic measuring/operating circuit for operating the ultrasonic transducers as well as for registering and evaluating measurement signals of the ultrasonic transducers as well as for providing measured values of volume flow or flow velocity;
    wherein the pairs are implemented as 1-traverse pairs or as 2-traverse pairs, wherein the ultrasonic transducers of a 1-traverse pair are arranged on opposite sides of the pipeline section, and wherein the ultrasonic transducers of a 2-traverse pair are arranged on a same side of the pipeline section,
    wherein at least three pairs are arranged on the pipeline section and distributed peripherally,
    wherein adjoining pairs of a number of pairs (N) have, in each case, an inner angle down to a minimum inner angle (MIA) between one another measured about a pipeline axis, which minimum inner angle obeys the following relationship: $MIA=360°/(T*N*F(T,N))$, with T as number of traverses and $F(T,N)=0.38+0.62*T+(0.048-0.01*T^2)*(N-2)^2$.

2. The clamp-on ultrasonic flowmeter as claimed in claim 1,
    wherein T=1 and wherein angles between different neighboring pairs differ from one another by less than $6*(N-2°)$ and, especially, less than $6*(N-2)°-2°$ and preferably less than $6*(N-2)°-4°$, or
    wherein T=2 and wherein angles between different neighboring pairs differ from one another by less than $(60/N+8-N°)$ and, especially, less than $(60/N)b620+6-N°)$ and preferably less than $(60/N+4-N°)$.

3. The clamp-on ultrasonic flowmeter as claimed in claim 1,
    wherein T=1 and a minimum total angle (MTA) is given by the following relationship:

$$MTA=(N-2)*(360°/N)+MIA,$$

wherein the minimum total angle describes a minimum angle spanned by all pairs.

4. The clamp-on ultrasonic flowmeter as claimed in claim 1,
    wherein the pairs have an equal separation from a flow disturbance relative to a midpoint of their measuring paths.

5. The clamp-on ultrasonic flowmeter as claimed in claim 1,
    wherein the pairs have relative to a midpoint of their measuring paths a maximum separation of 40 ID.

6. The clamp-on ultrasonic flowmeter as claimed in claim 1,
    wherein T=2.

7. The clamp-on ultrasonic flowmeter as claimed in claim 1,
    wherein the pipeline section is a component of the clamp-on ultrasonic flowmeter and is integrated into the pipeline.

8. The clamp-on ultrasonic flowmeter as claimed in claim 1,
    wherein the electronic measuring/operating circuit is adapted to calculate measured values of volume flow or flow velocity via an averaging of a measured variable of the ultrasonic signals.

9. The clamp-on ultrasonic flowmeter as claimed in claim 1,
    wherein N is less than 6.

* * * * *